May 20, 1952    A. LONGACRE ET AL    2,597,348
RANGE HEIGHT INDICATOR
Filed April 18, 1945
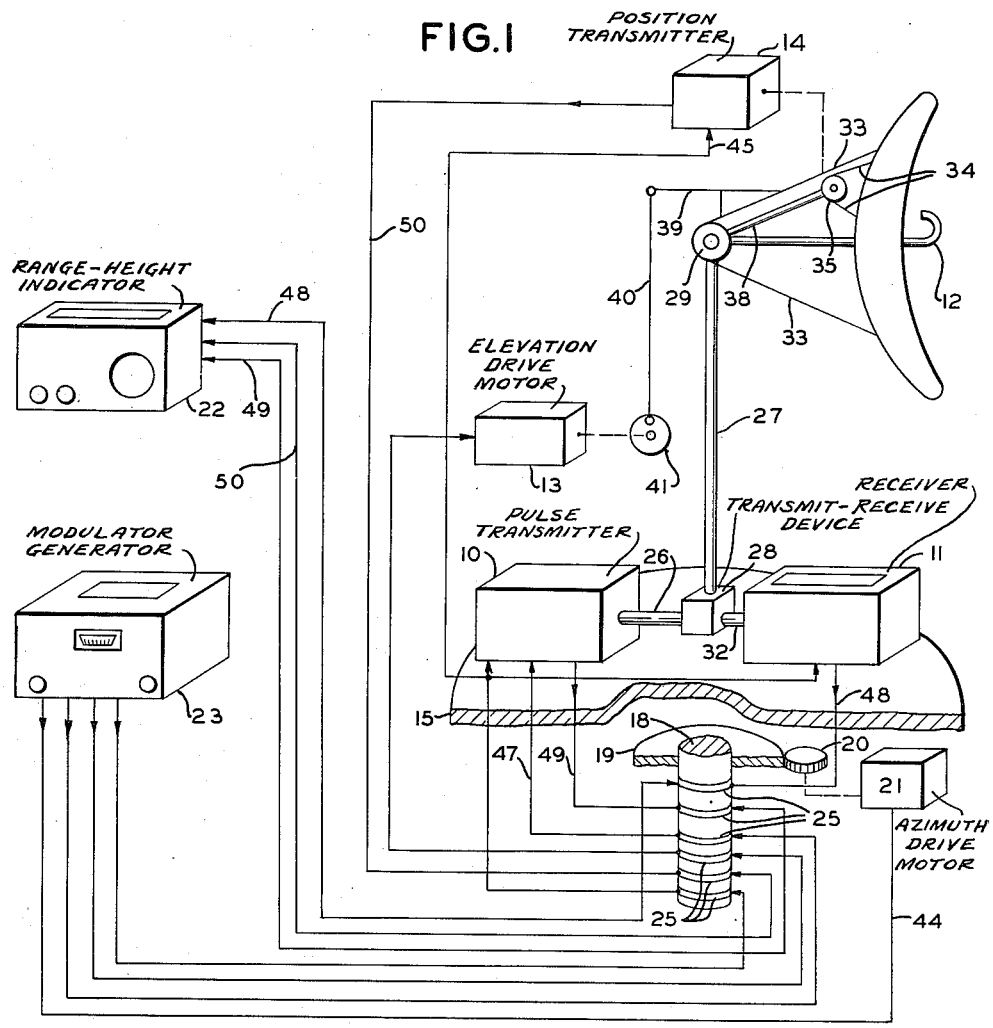
INVENTORS.
ANDREW LONGACRE
ERNEST C. POLLARD
BY
William D. Hall
ATTORNEY Patented May 20, 1952

2,597,348

UNITED STATES PATENT OFFICE 2,597,348

RANGE HEIGHT INDICATOR

Andrew Longacre, Exeter, N. H., and Ernest C. Pollard, Belmont, Mass., assignors, by mesne assignments, to the United States of America as represented by the Secretary of War Application April 18, 1945, Serial No. 588,995

3 Claims. (Cl. 343—11)

This invention relates to electrical systems and more particularly to radio systems.

Radio systems have been developed for searching a predetermined area of space and indicating on cathode ray tubes the location of any targets contained in the area.

As is well understood in the art, however, radio sets that will systematically search a sector in elevation and a complete 360 degrees in azimuth are in general too heavy and bulky to be of much use in areas where transportation is difficult, for example, in mountainous terrain.

The object of the present invention, therefore, is to present a radio system that will systematically search a predetermined portion of space, said system being of such weight and construction as to make it feasible to transport the system in mountainous terrain and in other areas where difficulties in transportation may be encountered.

In accordance with the present invention, there is provided a means of transmitting radio frequency energy pulses from a suitable directional antenna array, a receiver means associated with said antenna array to furnish information to an indicator means of any targets located within the searched area, and means for moving the antenna array in azimuth and elevation.

For a better understanding of the invention, together with other and further objects thereof, reference is had to the following description taken in connection with the accompanying drawings, and the scope of the invention will be pointed out in the appended claims.

In the accompanying drawing,

Fig. 1 is a schematic diagram of the radio system; and

Fig. 2 is a schematic wiring diagram of a portion of position transmitter 14 and range height indicator 22 of Fig. 1.

Referring now more particularly to Fig. 1, there is shown schematically the components of the radio set disclosed in this application. A pulse transmitter 10, a receiver 11, an antenna array 12, an elevation drive motor 13, and a position transmitter 14 are all mounted on a supporting means 15. The actual structure for attaching these units to supporting means 15 is not shown since it is not needed to understand the invention and would complicate the drawing. Supporting means 15 rests on and is rigidly fastened to axle 18. Axle 18 in turn rests on suitable supporting bearings. These bearings are not shown in Fig. 1. An azimuth gear 19 is rigidly fastened to axle 18. An azimuth drive gear 20 meshes with azimuth gear 19, and azimuth drive gear 20 is mechanically coupled to an azimuth drive motor 21. Two additional units, a range-height indicator 22 and a modulator generator 23 complete the electrical system. These last two units do not move when the rest of the system rotates in a manner to be described later. A set of slip rings 25 is mounted on axle 18 for making electrical connection between stationary and moving parts. Pulse transmitter 10 is connected to antenna array 12 by means of radio frequency transmission means 26 and 27, a transmit-receiver device 28 and an elevation wobble joint 29. A section 32 of radio frequency transmission means connects the transmit-receiver device 28 to receiver 11. Antenna array 12 is mechanically supported by struts 33 and 34. Struts 33 are rigidly fastened to antenna wobble joint 29 which also serves as a bearing. Struts 34 are rigidly fastened to bearing 35. Axle 38 supports the antenna array through bearing 35 and elevation wobble joint 29.

A fixed link 39 is rigidly fastened to struts 33. A movable link 40 mechanically connects fixed link 39 to eccentric 41. Eccentric 41 is mechanically connected to elevation drive motor 13.

Power is supplied to the pulse transmitter 10 and position transmitter 14 from modulator generator 23 through connection 47 and connection 45, respectively. Video signals are supplied to range-height indicator 22 from receiver 11 through connection 48 and a synchronizing pulse is supplied to range-height indicator 22 from pulse transmitter 10 through connection 49. Position transmitter 14 furnishes range-height indicator 22 with instantaneous antenna position data through connection 50.

Referring now to Fig. 2, there is shown a portion of the circuits contained in position transmitter 14 and range-height indicator 22 of Fig. 1. The circuit contained within the dotted line marked 14 is contained in position transmitter 14 of Fig. 1, and the circuit contained in the dotted line marked 22 is contained in the range-height indicator 22 of Fig. 1. In this embodiment of the invention, position transmitter 14 comprises a rotary transformer. A rotor 60 is mechanically coupled to antenna array 12 of Fig. 1. Stator 61 is connected to deflection plates 62 of a cathode ray tube 63 contained in range-height indicator 22 of Fig. 1. A voltage having a sawtooth wave form is applied to rotor 60 of the rotary transformer and to deflection plates 65 of cathode ray tube 63. The signal input 48 connects to intensity grid 67 of cathode ray tube 63.

In the operation of this system, modulator generator 23 supplies a control pulse to pulse transmitter 10. Pulse transmitter 10 produces a short pulse of radio frequency energy at a time corresponding to the time a pulse is received from the modulator generator 23. This pulse will usually have a time duration of one microsecond or less. The pulse of radio frequency energy is fed through radio frequency means 26 to transmit-receive device 28. From transmit-receive device 28, the energy travels up radio transmission means 27, through elevation wobble joint 29 to antenna array 12. The energy is radiated by antenna array 12 in the form of a paddle beam. This beam is relatively narrow in elevation, for example .6 of a degree, and relatively wide in azimuth, for example 2 or 3 degrees. If a target is within the area of space covered by the beam of energy, a portion of the radiated energy will strike the target and be reflected. A portion of this reflected energy will be picked up by antenna array 12. This energy passes through elevation wobble joint 29, down radio frequency transmission means 27 to transmit-receive device 28. From transmit-receive device the energy passes through radio frequency transmission means 32 to receiver 11. Receiver 11 furnishes a video pulse to range-height indicator 22 at a time corresponding to the time the reflected energy was received at antenna array 12. This video pulse is applied to intensity grid 67 of cathode ray tube 63 as shown in Fig. 2. In the actual operation of the system, several hundred pulses of energy are produced by pulse transmitter 10 each second.

Elevation drive motor 13 drives eccentric 41. The movable link 40 connected to eccentric 41 and acting upon fixed link 39 causes antenna array 12 to move up and down through a predetermined angle of elevation.

Elevation wobble joint 29 permits relative movement between antenna array 12 and radio frequency transmission means 27. Azimuth drive motor 21 turns azimuth gear 19 through azimuth drive gear 20. The rotation of azimuth gear 19 rotates supporting means 15 which in turn rotates antenna array 12. If the speed of rotation of azimuth drive motor 21 and elevation drive motor 13 are adjusted to suitable values, the beam of energy from antenna array 12 may be made to systematically scan a predetermined portion of space. The speed of azimuth drive motor 21 may be varied by suitable controls on the same unit which houses the modulator generator 23 so that antenna array 12 rapidly passes over areas of little interest or stops in a position such that the beam scans only in elevation.

A constant amplitude sawtooth voltage is applied to deflection plates 65 of cathode ray tube 63. A second sawtooth voltage wave form of constant amplitude is applied to rotor 60 of position transmitter 14. The coupling between rotor 60 and stator 61 depends on the position of rotor 60 with respect to stator 61. Since rotor 60 is coupled to antenna array 12 of Fig. 1, the amplitude of the sawtooth voltage induced in stator 61 is proportional to the sine of the angle of elevation of antenna array 12. The voltage induced in stator 61 is applied to deflection plates 62 of cathode ray tube 63. The constant amplitude sawtooth voltage on deflection plates 65 and the variable amplitude sawtooth voltage on deflection plates 62 causes the electron beam to form a time base on the cathode ray tube screen at an angle with the horizontal indicative of the position in elevation of antenna array 12. The video target echo signal applied to intensity grid 67 of cathode ray tube 63 causes a bright spot to appear on the time base at a distance from the initial point of the sweep that is proportional to the range to the target. The horizontal axis of the cathode ray tube is graduated to read horizontal range to a target and the vertical axis of the tube is graduated to read the elevation of the target with respect to some horizontal reference plane.

This system is well adapted for use in portable equipment. Through proper choice of frequencies, the individual units may be made light enough so that they may be transported by hand. The narrow beam angle permits the set to effectively search an area of space close to the surface of the earth. The relatively short transmitted pulse permits detection of targets close to and in line with large land masses. The above mentioned characteristics make the present system adaptable for use in mountainous terrain.

While there has been described what is at present considered the preferred embodiment of the invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. A radio system for locating targets in space, comprising means for transmitting a directional beam of radio frequency energy pulses, means for receiving reflected energy of said directional beam from targets intercepted thereby, means for angularly rotating said directional beam relative to a given direction, a cathode ray indicator having a screen and an electron beam, means for initiating the generation of first and second sawtooth voltages in synchronism with the transmission of each of said pulses, said first sawtooth voltage having a constant amplitude means for rendering the amplitude of said second sawtooth voltage proportional to the sine of the angle of said directional beam relative to said given direction, means for deflecting said electron beam along a first rectangular coordinate in accordance with said first saw-tooth voltage, means for deflecting said electron beam along a second rectangular coordinate in accordance with said second saw-tooth voltage, and means for controlling the intensity of said electron beam in accordance with said received reflected energy, whereby spots indicative of said targets are displayed on said screen and the position of said spots on said screen corresponds to the position of said targets in space.

2. A radio system as defined in claim 1, wherein said transmitted directional beam is relatively narrow in elevation and wide in azimuth, said directional beam is angularly rotated in elevation, and said given direction lies in a horizontal plane, whereby the first rectangular coordinate of any selected target spot on said screen corresponds to the range of a particular target and the second rectangular coordinate of said selected target spot corresponds to the height of said particular target.

3. A radio system as defined in claim 1, wherein said means for rendering the amplitude of said second saw-tooth voltage proportional to the sine of the angle of said directional beam relative to said given direction comprises a transformer having two windings, one of which is rotatable with respect to the other to effect a change in the mutual coupling therebetween, means for rotating said rotatable winding in synchronism with the rotation of said directional beam, said rotatable winding being so oriented with respect to said other winding that there is minimum coupling therebetween when said directional beam points in said given direction, means for applying said second saw-tooth voltage to one of said windings, and means for applying the voltage appearing across the other of said windings to said cathode ray indicator to effect the deflection of said electron beam along said second rectangular coordinate.

ANDREW LONGACRE.
ERNEST C. POLLARD.

REFERENCES CITED

The following references are of record in the file of this patent:

UNITED STATES PATENTS

| Number | Name | Date |
| --- | --- | --- |
| 2,231,929 | Lyman | Feb. 18, 1941 |
| 2,400,791 | Tolson | May 21, 1946 |
| 2,415,095 | Varian | Feb. 4, 1947 |
| 2,426,189 | Espenschied | Aug. 26, 1947 |
| 2,437,286 | Witt | Mar. 9, 1948 |
| 2,471,516 | Bryant | May 31, 1949 |

FOREIGN PATENTS

| Number | Country | Date |
| --- | --- | --- |
| 520,778 | Great Britain | May 3, 1940 |